United States Patent [19]

Reif et al.

[11] 3,898,172

[45] Aug. 5, 1975

[54] IRREVERSIBLE HUMIDITY INDICATOR

[75] Inventors: Robert B. Reif, Grove City; Philip F. Kurz, Columbus, both of Ohio

[73] Assignee: The United States of America as represented by the United States Energy Research and Development Administration, Washington, D.C.

[22] Filed: May 3, 1973

[21] Appl. No.: 356,863

[52] U.S. Cl. ............... 252/408; 23/230 R; 73/335; 116/114 AJ
[51] Int. Cl.² .................. G01W 1/00; C09K 3/00; G01N 31/00; G01N 33/00
[58] Field of Search ............. 252/408, 194; 73/335; 23/230 L, 230 R, 253 TP; 116/114 AJ, 118 A

[56] References Cited
UNITED STATES PATENTS

| | | | |
|---|---|---|---|
| 2,214,354 | 9/1940 | Snelling | 252/408 |
| 2,249,867 | 7/1941 | Snelling | 252/408 |
| 2,526,938 | 10/1950 | Davis et al. | 252/408 |
| 2,687,041 | 8/1954 | Anderegg | 73/335 |
| 2,876,321 | 3/1959 | Amdur et al. | 252/194 |
| 2,968,940 | 1/1961 | Feldman et al. | 73/61.1 R |
| 2,993,008 | 7/1961 | Anderson | 252/408 |
| 3,499,316 | 8/1968 | Krause | 73/61.1 R |
| 3,505,020 | 5/1970 | Caldwell | 73/61.1 R |
| 3,718,513 | 2/1973 | Baer et al. | 252/194 |
| 3,748,272 | 7/1973 | Wenz et al. | 252/194 |

FOREIGN PATENTS OR APPLICATIONS

| | | | |
|---|---|---|---|
| 11,861 | 1914 | United Kingdom | 73/335 |
| 10,130 | 12/1933 | Australia | 73/335 |

*Primary Examiner*—Benjamin R. Padgett
*Assistant Examiner*—T. S. Gron
*Attorney, Agent, or Firm*—Dean E. Carlson; Arthur A. Churm; Hugh W. Glenn

[57] ABSTRACT

Particles of colored dye are distributed over the surface of a dry, deliquescent salt having a neutral color. When exposed to a humidity level above that which causes deliquescence of the salt, the dye bleeds through and imparts its developed tincture to the resulting saturated salt solution. On dehydration, the dye remains infused throughout the dried salt to present an irreversible indication of the humidity exposure.

9 Claims, 1 Drawing Figure

PATENTED AUG 5 1975
3,898,172
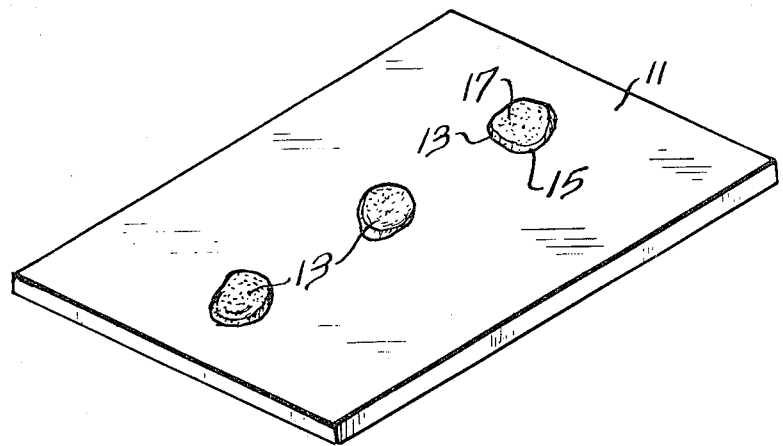

3,898,172

IRREVERSIBLE HUMIDITY INDICATOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

Humidity control and indication are often essential in the storage of various precisely calibrated electrical components. For instance, instrumentation containing precision resistive elements can be shifted from accurate calibration merely by an increase in relatiive humidity. In the event this should occur, it is most desirable that an irreversible indicator be present to register the previous humidity rise even if a drier environment should again be established. Otherwise, the instrumentation could be inadvertently employed to generate or transmit erroneous signals while out of calibration.

Other uses for a relative-humidity indicator arise in the storage of dry chemicals such as urea compounds where premature hydrolysis may be undesirable and otherwise undetectable. Also, various hydroscopic powders are often stored in a dried condition establishing a further need for an irreversible, humidity detector to ensure that an exposure to a high moisture level has not occurred.

Prior humidity indicators have used deliquescent salts that change colors on hydration. In some cases, dyes have been blended with the salts to accentuate color changes. Some indicators have depended on pH changes to produce color changes within the dye or the salt as moisture is absorbed. However, in systems of these types, the original color may be restored on drying or dehydration of the salt. No evidence will remain to reveal past incidents of high humidity after the moisture level has again returned to an acceptably low state. Moreover, in the preparation of these prior indicator systems, the dyes and salts are thoroughly mixed in solution and subsequently dried, thus restricting color changes to those that normally occur with liquefaction but reverse with solidification of the salt.

SUMMARY OF THE INVENTION

Therefore, it is an object of the present invention to provide an irreversible humidity indicator for revealing humidity events above a predetermined level.

It is also an object to provide a humidity indicator capable of revealing that a humidity between predetermined levels has occurred.

It is a further object to provide a method of detecting the occurrence of a humidity in excess of a predetermined level notwithstanding a subsequent decrease in humidity below that level.

These and other objects of the present invention are achieved in an irreversible humidity indicator having water-soluble dye particles heterogeneously combined with a dry, deliquescent salt disposed on a substrate. The salt has the propensity to liquefy at and above a predetermined humidity level whereupon the dye uniformly bleeds through and imparts its tincture to the resulting salt solution.

DESCRIPTION OF THE DRAWING

The present invention is illustrated in the accompanying FIGURE which is a perspective view of a humidity detector.

DETAILED DESCRIPTION OF PREFERRED EMBODIMENTS

It is often desirable to provide a record of whether a limiting humidity has occurred in a particular system. Such systems as mentioned above could be either involved in the storage of dehydrated materials or the packaging of sensitive and calibrated electrical components. The humidity indicator described hereinafter will be applicable in the measurement of either the absolute or the relative humidity within a system.

Absolute humidity is defined as the amount or mass of moisture in a known amount of air, while relative humidity is a percentage representing the amount of moisture in the air as compared with the maximum amount that the air could contain at the same temperature. Expressed in terms of pressures, the relative humidity is the percent of the partial pressure of water in the air in respect to the vapor pressure of water at the air temperature. The humidity levels presented in this application will be expressed in relative humidity; however, it will be clear that the humidity indicators and methods of the present invention will be equally applicable to the measurement of absolute humidity.

Referring now to the drawing where a humidity indicator is illustrated, a substrate 11 is presented carrying a plurality of heterogeneous salt-dye combinations 13 which adhere to one surface of the substrate. Although three salt-dye combinations are shown, it will be clear that one or more of these combinations can be used to register the occurrence of one or more particular humidity levels.

Each salt-dye combination includes a film or layer 15 of a deliquescent salt and a scattering or distribution of dye particles 17 over outwardly facing surfaces of the salt. The salt is one which will liquefy to form an aqueous, saturated salt solution on exposure to a predetermined humidity. The dye is water soluble to permit its infusion or bleedout through the salt layer when liquefaction occurs. The dye then imparts its developed color to the salt to indicate exposure to the predetermined humidity.

In preparing a humidity indicator as illustrated, a substrate 11 having fused or nonabsorbent surfaces is selected to avoid competition of the substrate and deliquescent salt for moisture. Fused glass or ceramics such as alumina are suitable choices. Certain plastic materials such as polyurethane with nonporous surfaces might also be acceptable if they are adapted to withstand the elevated drying temperature without warping or deterioration.

A flat and fused surface of the substrate is roughened and treated with a wetting agent, for instance tetramethyl ammonium hydroxide, to enhance adherence of the salt solution next applied. The salt solution is prepared by dissolving the deliquescent salt in water or an organic solvent. A plurality of separate drops or puddles of salt solution, the number of which corresponds to the desired number of salt-dye combinations, are placed on the substrate and allowed to spread into separate films or layers before drying at about 130°C. After drying, particles of dye are dusted or otherwise distributed over the surface of each dried-salt layer to complete the preparation of the humidity indicator. The distribution of dye particles imparts an original or undeveloped color to each salt-dye combination that is easily distinguished from the developed tint of the dye dissolved into the deliquescent salt.

In selecting the salts to be used in the present, humidity indicator, a number of criteria were considered. The salt must deliquesce at and above the relative humidity to be registered. Often moderate relative humidities below about 50% will be of interest. However, humidities below about 20% are of particular significance to prevent damage or deterioration of many stored instruments or materials. The saturated salt solution, resulting from the deliquescence of the dried salt, must be capable of sorbing or dissolving the dye particles. It is preferable that the salt be of neutral or submissive color, both in solution and the dried form, to allow the dye tincture to predominate when dissolved or infused throughout the salt.

A number of salts have been considered for deliquescence and dye solubility. Table I below lists a number of these salts along with the dyes used to rate their acceptability as a salt-dye combination when exposed to relative humidities of about 30 to about 45%. The dyes are named in accordance with their listing in the Colour Index, Volumes, I, II and III, 2d Ed., 1956, published in the United States by The American Association of Textile Chemists and Colorist, Lowell Technological Institute, Lowell, Mass., 1957; Supplement published 1963.

TABLE I

MATERIALS SCREENED AS RH INDICATORS

| Salt | Dye | Dye Solubility In Saturated Solution | Deliquescence |
| --- | --- | --- | --- |
| $AlCl_3$ | C.I. Acid Violet 19 | OK | OK - promising |
| $NH_4OOCCH_3$ | C.I. Acid Violet 19 | OK | OK, but sublimes |
| $NH_4CNS$ | C.I. Acid Violet 19 | OK | OK - promising |
| $As_2O_5$ | C.I. Acid Violet 19 | OK | OK - promising |
| $CaCl_2$ | C.I. Acid Violet 19 | OK | OK - promising |
| $Ca(NO_3)_2 \cdot 4H_2O$ | C.I. Acid Violet 19 | OK | OK, may be slow |
| $Cu(NO_3)_2 \cdot 3H_2O$ | C.I. Acid Violet 19 | OK | OK - promising |
| $Fe(NO_3)_3 \cdot 9H_2O$ | C.I. Acid Violet 19 | OK | Slow, bleaches dye |
| LiBr | C.I. Acid Violet 19 | OK | OK - promising |
| LiCl | C.I. Acid Violet 19 | OK | OK - promising |
| LiI | C.I. Acid Violet 19 | OK | OK - promising |
| $MgCl_2 \cdot 6H_2O$ | C.I. Acid Violet 19 | OK | OK - promising |
| $Mg(ClO_4)_2$ | C.I. Acid Violet 19 | OK | OK - fades dye slowly |
| $Ni(NO_3)_2 \cdot 6H_2O$ | C.I. Acid Violet 19 | OK | OK, may be slow |
| $KOOCCH_3$ | C.I. Acid Violet 19 | OK | OK, but bleaches dye |
| $KOOCCH_3$ | C.I. Acid Blue 9 | OK | OK - promising |
| KCNS | C.I. Acid Violet 19 | OK | OK - promising |
| $H_3PO_3$ | C.I. Acid Violet 19 | OK | OK - promising |
| $P_2O_5$ | C.I. Acid Violet 19 | OK | OK - promising |
| $P_2O_5$ | C.I. Acid Yellow 73 | OK | OK - promising |
| $P_2O_5$ | C.I. Acid Blue 1 | Poor | OK - Dye color muddy |
| $NaHSO_4$ | C.I. Acid Violet 19 | OK | OK, may be slow |
| NaOH | C.I. Acid Red 1 | OK | OK - promising |
| $SnCl_4$ | C.I. Acid Violet 19 | OK | OK - promising |
| $ZnBr_2$ | C.I. Acid Blue 1 | OK | OK - promising |
| $ZnI_2$ | C.I. Acid Violet 19 | OK | OK - promising |
| $ZnCl_2$ | C.I. Acid Violet 19 | OK | OK - promising |
| $Zn(NO_3)_2$ | C.I. Acid Violet 19 | OK | OK - promising |

It can be seen from the above table that a number of salts deliquesce at moderate or ambient humidities to form saturated salt solutions into which a dispersible or soluble dye will bleed to indicate past humidity occurrences. Salts found to be preferable from the standpoint of low-humidity deliquescence, neutral-color and dye solubility include LiBr, LiCl, LiI, $ZnBr_2$, $ZnCl_2$ and $ZnI_2$. These salts all deliquesce at relative humidities of 20% or less, are white or colorless in various states, i.e. dried, or in saturated solution, and provide saturated solutions that take up a variety of dyes.

In selecting optimum and preferred dyes for use, a number were considered particularly in respect to color and solubility in a deliquesced salt solution. Table II lists several of the more promising dyes in combination with various deliquescent salts. As before, the dyes are named in accordance with their listing in the Colour Index cited above.

TABLE II

SOLUBILITY OF DYES IN SATURATED SALT SOLUTIONS

| Dye | Original Dye Color | Dye in Saturated Salt Solution | | | | |
| --- | --- | --- | --- | --- | --- | --- |
| | | $CaCl_2$ | LiCl | $Mg(ClO_4)_2$ | $CH_3COOK$ | $ZnCl_2$ |
| Blue Dyes | | | | | | |
| C.I. Acid Blue 69 | Gray | Sl. Sol. | Sl. Sol. | Sl.Sol. | Excellent royal blue | Excellent, blue violet |
| C.I. Acid Blue 40 | Blue | Sl. Sol. | Soluble | Soluble | Sl. Sol. | Excellent purple |
| C.I. Acid Blue 1 | Bluish Gray | Excellent deep blue | Excellent deep blue | Excellent deep blue | Excellent deep blue | Excellent yellow brown |
| C.I. Basic Blue 9 | Green | Soluble | Excellent deep purple | Sl. Sol. | Soluble | Excellent deep blue |
| C.I. Acid Blue 9 | Magenta | Soluble | Excellent deep blue | Excellent deep blue | Excellent deep blue | Excellent deep brown |

TABLE II-Continued

SOLUBILITY OF DYES IN SATURATED SALT SOLUTIONS

| Dye | Original Dye Color | Dye in Saturated Salt Solution | | | | |
|---|---|---|---|---|---|---|
| | | $CaCl_2$ | LiCl | $Mg(ClO_4)_2$ | $CH_3COOK$ | $ZnCl_2$ |
| C.I. Acid Blue 158 | Brown | Soluble | Sl. Sol. | Excellent purple | Excellent deep blue | Sl. Sol. |
| C.I. Acid Blue 7 | Purple | Sl. Sol. | Sl. Sol. | Soluble | Sl. Sol. | Excellent deep gold |
| C.I. Basic Blue 11 | Blue | Sl. Sol. | Sl. Sol. | Sl. Sol. | Sl. Sol. | Excellent deep orange |
| Red Dyes | | | | | | |
| C.I. Acid Violet 19 | Reddish Gray | Excellent magenta | Excellent magenta | Soluble | Soluble fades | Excellent deep magenta |
| C.I. Acid Violet 12 | Maroon | Insoluble | Sl. Sol. | Insoluble | Sl. Sol. | Soluble, slow |
| C.I. Acid Violet 6 | Gray | Sl. Sol. | Sl. Sol. | Soluble | Soluble | Excellent purple |
| C.I. Solvent Red 49 | Scarlet | Soluble slow | Soluble | Soluble | Insoluble | Excellent orange |
| C.I. Basic Red 14 | Scarlet | Sl. Sol. | Soluble | Sl. Sol. | Soluble | Excellent yellow |
| Green Dyes | | | | | | |
| C.I. Basic Green 4 | Green | Soluble | Soluble | Sl. Sol. | Insoluble | Excellent orange brown |
| Yellow Dyes | | | | | | |
| C.I. Acid Yellow 73 | Orange | Insoluble | Sl. Sol. | Sl. Sol. | Excellent orange | Excellent pale gold |

On review of the above table it is seen that although a number of dyes are suitable for combination with various salts, certain triarylmethane dyes are to be preferred from the standpoint of both color and solubility.

These dyes of particular suitability are diamino and triamino derivatives of triphenylmethane and include C. I. Acid Blue 9 having the structural formula:

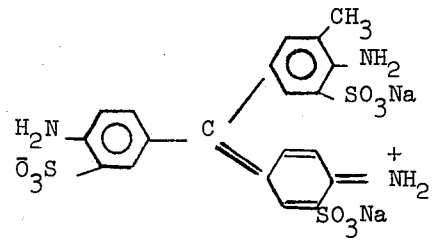

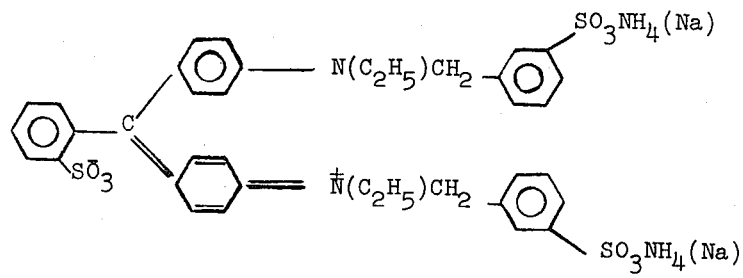

C. I. Acid Blue 1 having the structural formula:

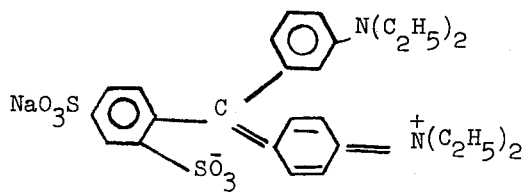

and C. I. Acid Violet 19 having the structural formula:

Various combinations of the preferred salts and preferred dyes were prepared on glass substrates as described above and tested for their efficacy in humidity detection. The salt-dye combinations were tested at 29°C. by beginning at 6% relative humidity and gradually increasing the humidity until the salt deliquesced and the dye bled throughout the saturated salt solution. The dye as thus developed imparted its color to the salt and subsequent drying and dehydration did not return the tinted salt to the original color. The original color of the salt-dye combination results from the distribution of the dry dye particles over the normally neutral-colored salt layer. Table III gives several salt-dye combinations that are particularly well suited for the humidity indicator presently described.

TABLE III

| Deliquescent Salt | Dye | Original Color | Transition Level Relative Humidity, percent | Transition Color |
| --- | --- | --- | --- | --- |
| ZnCl₂ | C.I. Acid Blue 1 | Bluish gray | 8 | Yellow-green |
| ZnBr₂ | C.I. Acid Blue 1 | Bluish gray | 10-11 | Yellow-green |
| ZnI₂ | C.I. Acid Blue 1 | Bluish gray | 20 | Yellow |
| LiBr | C.I. Acid Violet 19 | Reddish gray | 12 | Magenta |
| LiCl | C.I. Acid Violet 19 | Reddish gray | 15 | Magenta |
| LiI | C.I. Acid Violet 19 | Reddish gray | 16 | Magenta |
| ZnCl₂ | C.I. Acid Violet 19 | Reddish gray | 8 | Magenta |
| ZnBr₂ | C.I. Acid Violet 19 | Reddish gray | 10-11 | Magenta |
| ZnI₂ | C.I. Acid Violet 19 | Reddish gray | 20 | Magenta |

Although Table III shows specific dyes in combination with specific salts, it will be clear that any of the soluble dyes mentioned above, especially those listed as having particular suitability, could be combined with any of the salts listed. For example, a humidity indicator containing a single salt-dye combination can be prepared by employing $ZnI_2$ with C. I. Acid Blue 9. Similarly, LiBr can be combined with C. I. Acid Blue 1 or with C. I. Acid Blue 9 in preparing a suitable relative humidity indicator. The relative-humidity transition levels are very nearly the same regardless of the dye selected for use since it is the liquefaction of the salt rather than qualities of the dye which determines the humidity at which the color change occurs.

One factor that affects relative-humidity transition levels is temperature. For a particular indicator system, the transition levels will decrease with increasing temperature in a nonlinear fashion. These temperature-produced effects are illustrated in Table IV.

TABLE IV

TEMPERATURE EFFECT ON HUMIDITY INDICATORS

| Salt | Dye | Color Change | Transition Point, Percent Relative Humidity | | | |
| --- | --- | --- | --- | --- | --- | --- |
| | | | 16°C | 21 to 24°C | 27 to 29°C | 37°C |
| ZnCl₂ | C.I. Acid Blue 1 | Bluish gray to yellow-green | 16.0 | 10.0 | 8.0 | 6.0 |
| ZnBr₂ | C.I. Acid Blue 1 | Bluish gray to yellow-green | 18.0 | 12.0 | 9.0 | 7.0 |
| LiBr | C.I. Acid Violet 19 | Reddish gray to magenta | 19.0 | 14.0 | 11.0 | 8.0 |
| LiCl | C.I. Acid Violet 19 | Reddish gray to magenta | 21.0 | 17.0 | 16.0 | 13.0 |

As can be seen from the foregoing, extremely accurate humidity measurements can be made by monitoring the temperature or by maintaining a constant temperature in the system to be monitored. However, it will be noted that the temperature effect on relative humidity is in part contributed by the direct variation of water vapor pressure with temperature.

In determining relative humidity with an indicator as described, one or more salt-dye combinations are disposed on a substrate and exposed to the humidity level in question. The salt-dye combinations are previously tested to predetermine the minimum humidity levels at which the salts deliquesce and color changes occur. Where a plurality of salt-dye combinations are used, salts are selected which deliquesce at minimum humidities both above and below the suspected humidity level.

As each salt-dye combination is exposed to a humidity which is of a sufficient level to cause the salt to liquefy, the colored dye particles on the surface of the salt layer begin to dissolve in the resulting saturated salt solution. As the particles dissolve, the dye develops its full color and uniformly infuses throughout the solution. On lowering the humidity to below this transition level, the dye tincture remains in the dried salt such that the color change is not reversed.

After exposure, the humidity indicator is inspected and those salt-dye combinations in which the dye has bled through the salt are identified by their color change. Since the salts in these combinations have deliquesced, it can be concluded that the humidity level exposure has been in excess of that required to cause deliquescence. The combinations that have not undergone color changes are those that have not deliquesced and the corresponding relative humidities have not been attained.

In order to further illustrate the present invention, the following examples of humidity indicators are presented in addition to those set forth above.

EXAMPLE I

A fused glass slide was roughened slightly with emery paper at three separate locations along its length and wetted with tetramethyl ammonium hydroxide. Three separate, saturated salt solutions of $ZnCl_2$, $ZnBr_2$ and LiCl were prepared and approximately 0.1 ml of each solution was separately brushed onto a roughened location on the glass slide. The salt solutions on the slide were evaporated to dryness at 130°C. and 6% relative humidity to form three spaced-apart salt layers adhering to one surface of the slide. A thin film of dye, C. I. Acid Violet 19, was then dusted onto each deliquescent salt layer to impart a reddish gray color to each salt-dye combination. On exposure to gradually increasing relative humidity at about 31°C., it was found that the salt-dye combinations changed colors from reddish gray to magenta at 7.25% R.H., 9.0% R.H. and 14.0% R.H. for the $ZnCl_2$, $ZnBr_2$, and LiCl salts, respectively. After drying by heating at about 5% relative humidity for more than 6 weeks, the salt-dye combinations retained their magenta color.

EXAMPLE II

A humidity indicator is prepared in the same manner as described in Example I except that tetramethyl ammonium hydroxide is included in the salt solutions at about 1 weight percent as a wetting agent. Also, a separate LiBr salt layer is prepared on the glass slide in addition to the $ZnCl_2$, $ZnBr_2$ and LiCl salt layers, and each layer is dusted with powdered C. I. Acid Blue 9. On exposure to increased relative humidity at 21°C., it is found that the zinc salt-dye combinations change from magenta to deep brown, while the combinations containing lithium change from magenta to deep blue. The transformations of color occur at 11, 13, 14 and 18.5 percent relative humidity for $ZnCl_2$, $ZnBr_2$, LiBr and LiCl, repsectively. Subsequent dehydration of the salt-dye combination does not affect the color change after the dye has bled through the salt layers.

EXAMPLE III

Five saturated salt solutions of $ZnCl_2$, 75% $ZnCl_2$ — 25% ZnBr, 50% $ZnCl_2$ — 50% ZnBr, 25% $ZnCl_2$ — 75% ZnBr and $ZnBr_2$ were prepared and portions of each used to form salt-dye combinations as in Example I except C. I. Acid Blue 1 was sprinkled over the dried salt layers. The salt-dye combinations at 29°C. were found to transform from bluish gray to yellow-green at 9% R.H. for $ZnCl_2$, 10% R.H. for 75% $ZnCl_2$ — 25% $ZnBr_2$, 10% R.H. for 50% $ZnCl_2$ — 50% ZnBr, 11% R.H. for 25% $ZnCl_2$ — 75% $ZnBr_2$, and at 11% R.H. for ZnBr. On subsequent drying, none of the salt-dye combinations reversed to the original color.

It will be clear from the foregoing that a humidity indicator is provided that can be stored in a closed system for a period of time and subsequently recovered to determine if a predefined humidity level has occured within that system. The indicator employs salt-dye combinations which undergo irreversible color changes on exposure to increased humidity levels and which maintain these color changes even after the humidity has returned to a low level to detect past occurrences of high humidity. Through use of a plurality of different salt-dye combinations in a single humidity indicator, the maximum humidity exposure occurring within the system can be defined between the transformation humidities of those salt-dye combinations which have triggered and those which remain unchanged.

The embodiments of the invention in which an exclusive property or privilege is claimed are defined as follows:

1. In a humidity indicator consisting essentially of a combination of a water-soluble dye and a deliquescent salt disposed on a moisture-impervious, fused substrate the improvement wherein said deliquescent salt, being in dried state, is adherently disposed directly on said fused substrate, and said water-soluble dye, characterized by exhibiting a recognizable color development on dissolution, is distributed as fine try dye particles directly on outwardly facing surfaces of said dried salt to provide an irreversible color change on exposure to relative humidity levels of between about 6 and 20% at ambient tempertures at which said salt deliquesces.

2. The humidity indicator of claim 1 wherein a plurality of the discrete salt-dye combinations are disposed on said substrate, each of said combinations having a deliquescent salt with a propensity to liquefy at a minimum humidity level other than the minimum humidity level effective to liquefy salts within other of said plurality of discrete salt-dye combinations, whereby said humidity indicator is capable of permanently recording the occurrence of a maximum humidity level as being between the humidity levels that cause deliquescence in those salts that have liquefied and those salts that have not liquefied.

3. The humidity indicator of claim 2 adapted to determine relative humidity levels of 7–14% at ambient temperature wherein three discrete said salt-dye combinations are disposed on said substrate, said salt-dye combinations consist of $ZnCl_2$ — C. I. Acid Violet 19, $ZnBr_2$ — C. I. Acid Violet 19 and LiCl — C. I. Acid Violet 19.

4. The humidity indicator of claim 1 having a fused glass substrate with a nonabsorbent surface, said surface including a roughened portion treated with a wetting agent for receiving a layer of said deliquescent salt, and said water-soluble dye having the form of discrete particles distributed over the surface of said salt layer.

5. The humidity indicator of claim 1 wherein said deliquescent salt is selected from the group of neutral-color salts consisting of LiI, LiCl, LiBr, $ZnI_2$, $ZnCl_2$ and $ZnBr_2$ and said dye is selected from the group of triarylmethane dyes consisting of C. I. Acid Violet 19, C. I. Acid Blue 1 and C. I. Acid Blue 9.

6. A method of preparing the humidity indicator of claim 1 comprising: dissolving said salt in liquid to form a solution, applying said film of said solution on the surface of a substrate, evaporating said film to dryness, thus leaving a dried salt residue on said substrate, and sprinkling particles of dry, water-soluble dye over said dried salt residue.

7. The method of claim 6 including the steps of roughening said surface of the substrate and treating the roughened surface with a wetting agent prior to applying said film of salt solution thereon in order to enhance the adherent qualities of said dried salt residue to said substrate.

8. A method of determining the occurrence of a humidity level comprising: applying a film of deliquescent salt solution onto a nonabsorbent, fused substrate; evaporating said salt solution to dryness to form a dried salt layer adhering to said fused substrate; said dried salt consisting essentially of said deliquescent salt having a propensity to liquefy at between about 6 and 20% relative humidity at ambient temperatures and above said humidity level and being of neutral color in both liquid and solid form; sprinkling the surface of said dried salt with dry, water-soluble dye particles characterized by exhibiting a recognizable color development on dissolution to form a heterogeneous salt-dye combination on said substrate; exposing said salt-dye combination to said humidity level to form a liquid solution of said salt uniformly infused with the tincture of said dye whereby the occurrence of said humidity level is irreversibly determined.

9. The method of claim 8 adapted to measure relative humidities below about 20% wherein said step of evaporating said deliquescent salt solution to dryness is performed at about 130°C. and 6% relative humidity; said deliquescent salts being selected from the group of natural-color salts which deliquesce at below about 20% relative humidity consisting of LiI, LiCl, LiBr, $ZnI_2$, $ZnCl_2$ and $ZnBr_2$ and said water-soluble dye particles being selected from the group of colored triarylmethane dye particles consisting of C. I. Acid Violet 19, C. I. Acid Blue 1 and C. I. Acid Blue 9.

* * * * *